(12) United States Patent  
McNamee et al.

(10) Patent No.: US 8,294,070 B2  
(45) Date of Patent: Oct. 23, 2012

(54) AIR CIRCUIT FOR COOKING APPLIANCE INCLUDING COMBINATION HEATING SYSTEM

(75) Inventors: Robert McNamee, Iowa City, IA (US); Robert A. Schulte, Williamsburg, IA (US)

(73) Assignee: ACP, Inc., Cedar Rapids, IA (US)

( * ) Notice: Subject to any disclaimer, the term of this patent is extended or adjusted under 35 U.S.C. 154(b) by 298 days.

(21) Appl. No.: 12/681,948

(22) PCT Filed: Oct. 9, 2008

(86) PCT No.: PCT/US2008/079399  
§ 371 (c)(1), (2), (4) Date: Jul. 8, 2010

(87) PCT Pub. No.: WO2009/049081  
PCT Pub. Date: Apr. 16, 2009

(65) Prior Publication Data  
US 2010/0270293 A1    Oct. 28, 2010

Related U.S. Application Data

(60) Provisional application No. 60/960,662, filed on Oct. 9, 2007.

(51) Int. Cl.  
*H05B 6/80* (2006.01)  
*H05B 6/66* (2006.01)

(52) U.S. Cl. ........ 219/679; 219/681; 219/684; 219/702; 219/734; 219/735; 219/756; 219/757

(58) Field of Classification Search .................. 219/679, 219/681, 684, 702, 734, 735, 756, 757  
See application file for complete search history.

(56) References Cited

U.S. PATENT DOCUMENTS

| | | | |
|---|---|---|---|
| 2,862,095 A | 11/1958 | Scofield | |
| 3,324,844 A | 6/1967 | Huffman | |
| 3,889,099 A | 6/1975 | Nuss | |
| 3,978,843 A * | 9/1976 | Durth | 126/21 A |
| 4,071,738 A * | 1/1978 | Jenn et al. | 219/400 |
| 4,108,139 A | 8/1978 | Gilliom et al. | |
| 4,123,643 A | 10/1978 | Burke | |
| 4,137,442 A | 1/1979 | Tateda | |
| 4,283,614 A | 8/1981 | Tanaka et al. | |
| 4,289,792 A * | 9/1981 | Smith | 426/241 |
| 4,332,992 A | 6/1982 | Larsen et al. | |
| 4,335,290 A | 6/1982 | Teich | |
| 4,338,911 A | 7/1982 | Smith | |

(Continued)

FOREIGN PATENT DOCUMENTS

EP    809418    11/1997

(Continued)

*Primary Examiner* — Ngan Ngo  
(74) *Attorney, Agent, or Firm* — Diederiks & Whitelaw, PLC (57) ABSTRACT

A cooking appliance includes a recirculating airflow which is directed through particularly configured air plenum and nozzle structure that synergistically combine to enhance an overall cooking efficiency and effectiveness. In particular, the configuration of the air plenum, as well as the sizing and distribution of oven cavity entry nozzles, provides for an enhanced flow of heated air to the food product, thereby resulting in short cooking times due to high heat transfer while also providing an even browning and crisping of the food item being cooked. In addition, the cooking appliance incorporates an exhaust system wherein cooling air and a percentage of the recirculating airflow are mixed prior to being exhausted from an angled exhaust mixing tube.

20 Claims, 4 Drawing Sheets

U.S. PATENT DOCUMENTS

| | | | |
|---|---|---|---|
| 4,384,850 A | | 5/1983 | Dixon |
| 4,395,233 A | | 7/1983 | Smith et al. |
| 4,409,453 A | * | 10/1983 | Smith ......................... 219/684 |
| 4,430,541 A | | 2/1984 | Day, Jr. |
| 4,431,889 A | | 2/1984 | Saponara et al. |
| 4,477,706 A | | 10/1984 | Mittelsteadt |
| 4,480,164 A | | 10/1984 | Dills |
| 4,560,395 A | | 12/1985 | Davis |
| 4,585,923 A | | 4/1986 | Binder |
| 4,591,333 A | | 5/1986 | Henke |
| 4,627,409 A | | 12/1986 | Kagomoto |
| 4,865,010 A | | 9/1989 | Kett |
| 4,870,255 A | | 9/1989 | Fujii et al. |
| 4,940,869 A | | 7/1990 | Scholtes et al. |
| 4,951,645 A | | 8/1990 | Luebke et al. |
| 5,082,999 A | | 1/1992 | Yamaguchi et al. |
| 5,204,503 A | | 4/1993 | Maiellano, Jr. et al. |
| 5,205,274 A | * | 4/1993 | Smith et al. ................. 126/21 A |
| 5,254,823 A | | 10/1993 | McKee et al. |
| 5,272,299 A | | 12/1993 | Ovadia |
| 5,296,683 A | | 3/1994 | Burkett et al. |
| 5,309,981 A | | 5/1994 | Binder |
| 5,310,978 A | | 5/1994 | Smith et al. |
| 5,398,666 A | * | 3/1995 | Smith et al. ................. 126/21 A |
| 5,434,390 A | | 7/1995 | McKee et al. |
| 5,510,601 A | | 4/1996 | Smith et al. |
| 5,525,782 A | | 6/1996 | Yoneno et al. |
| 5,558,793 A | | 9/1996 | McKee et al. |
| 5,601,070 A | | 2/1997 | Hotard et al. |
| 5,655,511 A | | 8/1997 | Prabhu et al. |
| 5,717,192 A | | 2/1998 | Dobie et al. |
| 5,756,974 A | | 5/1998 | Hong |
| 5,767,488 A | | 6/1998 | Barger et al. |
| 5,927,265 A | | 7/1999 | McKee et al. |
| 5,981,928 A | | 11/1999 | Lee |
| 5,990,466 A | | 11/1999 | McKee et al. |
| 6,008,483 A | | 12/1999 | McKee et al. |
| 6,049,066 A | | 4/2000 | Wilson |
| 6,058,924 A | | 5/2000 | Pool, III et al. |
| 6,060,701 A | | 5/2000 | McKee et al. |
| 6,093,918 A | | 7/2000 | Sohn |
| 6,218,650 B1 | | 4/2001 | Tsukamoto et al. |
| 6,218,651 B1 | | 4/2001 | Chung |
| 6,227,189 B1 | | 5/2001 | Dougherty |
| 6,250,296 B1 | | 6/2001 | Norris et al. |
| 6,262,406 B1 | | 7/2001 | McKee et al. |
| 6,337,468 B1 | | 1/2002 | Worthington et al. |
| 6,359,271 B1 | | 3/2002 | Gidner et al. |
| 6,373,037 B1 | | 4/2002 | Brown et al. |
| 6,376,817 B1 | | 4/2002 | McFadden et al. |
| 6,384,381 B2 | | 5/2002 | Witt et al. |
| 6,472,647 B2 | | 10/2002 | Lee et al. |
| 6,521,870 B2 | | 2/2003 | Nolan et al. |
| 6,525,301 B1 | | 2/2003 | Graves et al. |
| 6,528,772 B1 | | 3/2003 | Graves et al. |
| 6,528,773 B2 | | 3/2003 | Kim et al. |
| 6,541,745 B2 | | 4/2003 | Kim et al. |
| 6,557,543 B2 | | 5/2003 | Cole et al. |
| 6,572,911 B1 | | 6/2003 | Corcoran et al. |
| 6,576,879 B1 | | 6/2003 | Hoh |
| 6,595,117 B1 | | 7/2003 | Jones et al. |
| 6,603,102 B2 | | 8/2003 | Brown et al. |
| 6,872,919 B2 | | 3/2005 | Wakefield et al. |
| 6,874,495 B2 | | 4/2005 | McFadden |
| 7,009,147 B1 | | 3/2006 | Schulte |
| 7,055,518 B2 | | 6/2006 | McFadden et al. |
| 7,109,447 B2 | | 9/2006 | Goranson |
| 7,109,448 B2 | | 9/2006 | Goranson |
| 7,235,763 B2 | | 6/2007 | Christiaansen et al. |
| 7,241,978 B2 | | 7/2007 | Iwamoto |
| 7,834,299 B2 | * | 11/2010 | Claesson et al. ............. 219/681 |
| 7,838,807 B2 | * | 11/2010 | Claesson et al. ............. 219/681 |
| 2002/0134778 A1 | * | 9/2002 | Day et al. ...................... 219/681 |
| 2005/0173420 A1 | | 8/2005 | Oh et al. |
| 2006/0130824 A1 | | 6/2006 | Rummel et al. |
| 2006/0157482 A1 | | 7/2006 | Lingenheil et al. |
| 2006/0159479 A1 | | 7/2006 | Sugita et al. |
| 2006/0169272 A1 | | 8/2006 | McFadden et al. |
| 2006/0225727 A1 | | 10/2006 | Kim et al. |
| 2006/0259547 A1 | | 11/2006 | Bogatin et al. |
| 2007/0095822 A1 | | 5/2007 | Wiseman et al. |
| 2007/0103887 A1 | | 5/2007 | Bleier et al. |
| 2007/0163567 A1 | | 7/2007 | Kaneko et al. |
| 2007/0187387 A1 | | 8/2007 | Kim et al. |
| 2007/0194011 A1 | | 8/2007 | McFadden |
| 2007/0194014 A1 | | 8/2007 | Jeong |
| 2007/0194015 A1 | | 8/2007 | Kim |
| 2009/0065493 A1 | * | 3/2009 | Hines, Jr. ...................... 219/400 |
| 2010/0104997 A1 | * | 4/2010 | Wolfe et al. ................... 432/152 |
| 2010/0229847 A1 | * | 9/2010 | Rogers et al. ................ 126/21 A |

FOREIGN PATENT DOCUMENTS

| | | |
|---|---|---|
| FR | 2705766 | 12/1994 |
| GB | 2190486 | 5/1987 |
| JP | 56044536 | 4/1981 |

\* cited by examiner

AIR CIRCUIT FOR COOKING APPLIANCE INCLUDING COMBINATION HEATING SYSTEM

CROSS-REFERENCE TO RELATED APPLICATIONS

This application represents a National Stage application of PCT/US2008/079399 entitled "Air Circuit for Cooking Appliance Including Combination Heating System" filed Oct. 9, 2008, pending, which claims the benefit of U.S. Provisional Patent Application Ser. No. 60/960,662 entitled "Air Circuit for Cooking Appliance Including Combination Heating System" filed Oct. 9, 2007.

BACKGROUND OF THE INVENTION

1. Field of the Invention

The present invention pertains to the art of cooking appliances and, more particularly, to a compact cooking appliance capable of convection heating with other heating techniques to perform a cooking operation.

2. Discussion of the Prior Art

There exists a wide range of cooking appliances on the market. Many of these cooking appliances are designed for use in cooking various types of food products in different ways. For instance, where more conventional cooking appliances generally relied upon radiant energy as the sole heat source, more recent trends combine a radiant heat source with convection or microwave heating techniques, thereby increasing the versatility of the cooking appliance while potentially shortening required cook times. In particular, the prior art contains many examples of at least appliances that combine radiant and convection cooking, as well as combination convection and microwave cooking, techniques.

Regardless of the existence of these known arrangements, there still exists a need for a cooking appliance that employ multiple heating techniques in an efficient and effective manner to handle a wide range of food items. Particularly, there exists a need for a cooking appliance that can be used to rapidly prepare food products that require numerous different heat sources for full and complete cooking in an expedited manner. For example, the rapid preparation of commercially produced, open-faced grilled sandwiches raises various cooking concerns. Open-faced grilled sandwiches generally require, at the very least, that heat be directed both downward onto an upper portion of the sandwich and upward onto a lower bun portion of the sandwich. In most cases this is accomplished by passing the open-faced sandwich on a conveyor belt through an oven between opposing radiant heat sources. While effective to a degree, the process can be time consuming and really does not result in a uniform heating of the meat, cheese and/or other toppings on the bread, nor an even toasting of the bread itself.

In addition, a dual radiant oven of the type described above is simply not suitable for many other applications. For instance, an additional microwave oven or the like would typically be employed to heat soup or other liquid-based food items. To address this and other concerns, it has also been proposed in the prior art to combine each of radiant, convection and microwave energy sources in a compact, versatile cooking appliance. Such a prior art arrangement is disclosed, for example, in U.S. Pat. No. 7,235,763.

Regardless of the variety of known cooking appliances, there exists the need for a versatile cooking appliance that employs at least convection cooking and enhanced airflow features that enable a wide range of food items to be rapidly and effectively cooked. In connection with the airflow design, the manner in which the air is directed upon the food affects the browning, crispness and other characteristics of the food. Typical results with prior art yields food items with areas of increased browning compared to other areas of the food item. These areas of increased browning correspond to air nozzle location. Typical results yield a food item with a pattern of circular areas that visually have significantly more browning than the surrounding areas of the food item. The invention addresses this problem.

SUMMARY OF THE INVENTION

In its broadest aspects, the invention is directed to a convection cooking appliance. In accordance with the most preferred embodiment of the invention, the cooking appliance including an oven cavity having top, bottom and opposing side walls, a door for selectively accessing the oven cavity, at least one radiant heating element exposed to the oven cavity, a blower having a convection fan, a convection heating element directly exposed to an airflow generated by the convection fan and, preferably, multiple microwave heating devices. Behind a rear plate for the oven cavity is established an air return plenum portion for directing a return flow of air from the oven cavity to the blower. The cooking appliance also includes a discharge air plenum which extends above the oven cavity enabling a convection air stream to flow from the convection fan, across a catalyst and into the oven cavity through a plurality of downwardly exposed nozzles. The nozzles are sized, spaced and located relative to a load support in a manner that assures effective convection cooking. An exhaust tube opens to the discharge air plenum and projects into one end portion of an enlarged, downwardly and rearwardly extending exhaust duct. The air stream from the exhaust tube merges with a cooling air stream established in the cooking appliance about the oven cavity, while additional fresh intake air directly enters the oven cavity about the door.

The present invention is more specifically concerned with providing a combination cooking appliance including a recirculating airflow which is directed through particularly configured plenum and nozzle structure which synergistically combine to enhance the overall efficiency and effectiveness of the appliance. In particular, the configuration of the air plenum, as well as the sizing and distribution of air nozzles, provides for an enhanced flow of heated air to the food product, thereby resulting in short cooking times due to high heat transfer while also providing an even browning and crisping of the food item being cooked. Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
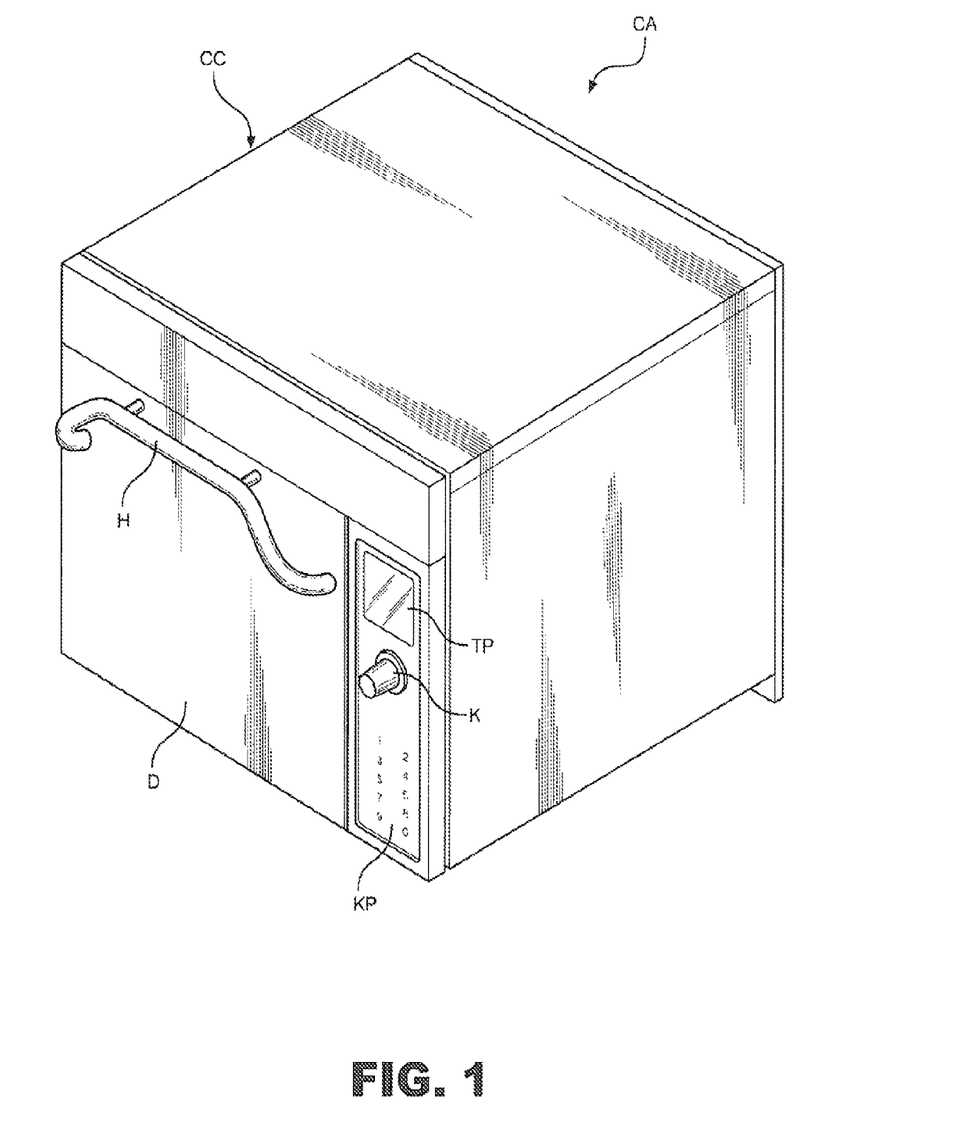
FIG. 1 is an upper right perspective view of a cooking appliance incorporating a combination heating system constructed in accordance with the present invention.

With initial reference to FIG. 1, a cooking appliance constructed in accordance with the present invention is generally indicated at 2. As will be discussed more fully below, cooking appliance 2 constitutes a combination cooking appliance which preferably employs radiant, convection and microwave heating techniques to rapidly and effectively cook a wide range of food items. As shown, cooking appliance 2 includes a cabinet 4 and a door 6 that is provided with a handle 8. In the preferred embodiment shown, door 6 is pivotally mounted about a lower horizontal axis such that handle 8 can be utilized to open door 6 in order to access an internal oven cavity 12. However, a vertical pivoting arrangement, or another type of door opening system, could be readily employed. Cooking appliance 2 also includes a programming interface 15 which is shown to include a control knob 18, a key pad 20 and a touch pad display 22.

Figure 2:
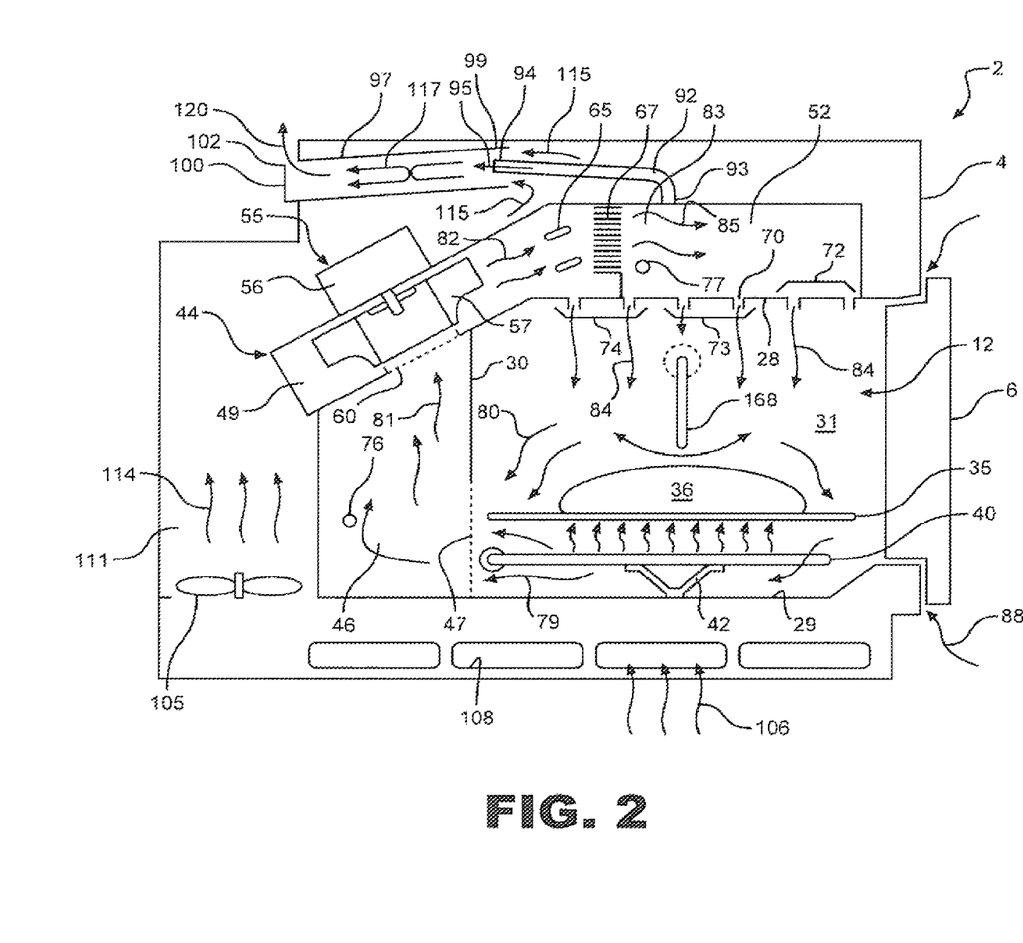
FIG. 2 is a cross-sectional side view of the cooking appliance constructed in accordance with the present invention.

As perhaps best illustrated in the schematic side view of FIG. 2, oven cavity 12 includes top, bottom, rear and opposing side walls 28-31 that collectively define a cooking chamber. Mounted within oven cavity 12 is an oven rack 35 which, in the preferred embodiment, constitutes a metal wire rack used to support a food item 36 during cooking. The use of a metal wire rack is desired in order to allow effective air flow around food item 36, while also providing a fairly open support area such that the food item 36 can be radiantly heated from below. As depicted, oven rack 35 is spaced from bottom wall 29 to allow for a sufficient volume of air to flow past the to food item 36 such that convection heating can be utilized for both the top and bottom of the food item 36, while also promoting even browning on both the top and bottom. Arranged between oven rack 35 and bottom wall 29 is a radiant heating element 40. More specifically, a support 42 is provided to retain radiant heating element 40 at a substantially intermediate position between bottom wall 29 and oven rack 35. In the most preferred embodiment shown, a single radiant heating element 40 is employed, with radiant heating element 40 being constituted by a sheathed, resistive-type heating element. However, at this point, it should be recognized that multiple radiant heating elements of varying designs can be employed in connection with the invention.

Extending about at least the rear and upper portions of oven cavity 12 is an air plenum 44. More specifically, air plenum 44 includes a return plenum portion 46 which is arranged behind and at least partially defined by rear wall 30. Rear plenum portion 46 has associated therewith an air intake 47 which is defined by a plurality of spaced openings located in rear wall 30 of oven cavity 12. In the most preferred embodiment shown, the plurality of openings extend from above rack 35 to below radiant heating element 40. Air plenum 44 also includes a blower plenum portion 49 and a discharge plenum portion 52. Mounted in blower plenum portion 49 is a blower 55 that includes an electric motor 56 and a fan or impeller unit 57. Blower plenum portion 49 is in fluid communication with return plenum portion 46 through a plurality of openings 60 which leads to a central intake portion of fan unit 57.

Downstream of blower 55, essentially at the juncture of blower plenum portion 49 and discharge plenum portion 52, is a convection heating element 65. Although convection heating element 65 can take various forms, it is preferred to employ a sheathed electric heating unit. Mounted directed adjacent convection heating element 65 is a catalyst unit 67. In a manner known in the art, catalyst unit 67 functions to chemically breakdown airborne byproducts associated with cooking operations. Given the relative position between convection heating element 65 and catalyst unit 67, convection heating element 65 advantageously functions to heat catalyst unit 67 and maintain its temperature at or above a minimum temperature required for proper function of the catalyst.

Figure 3:
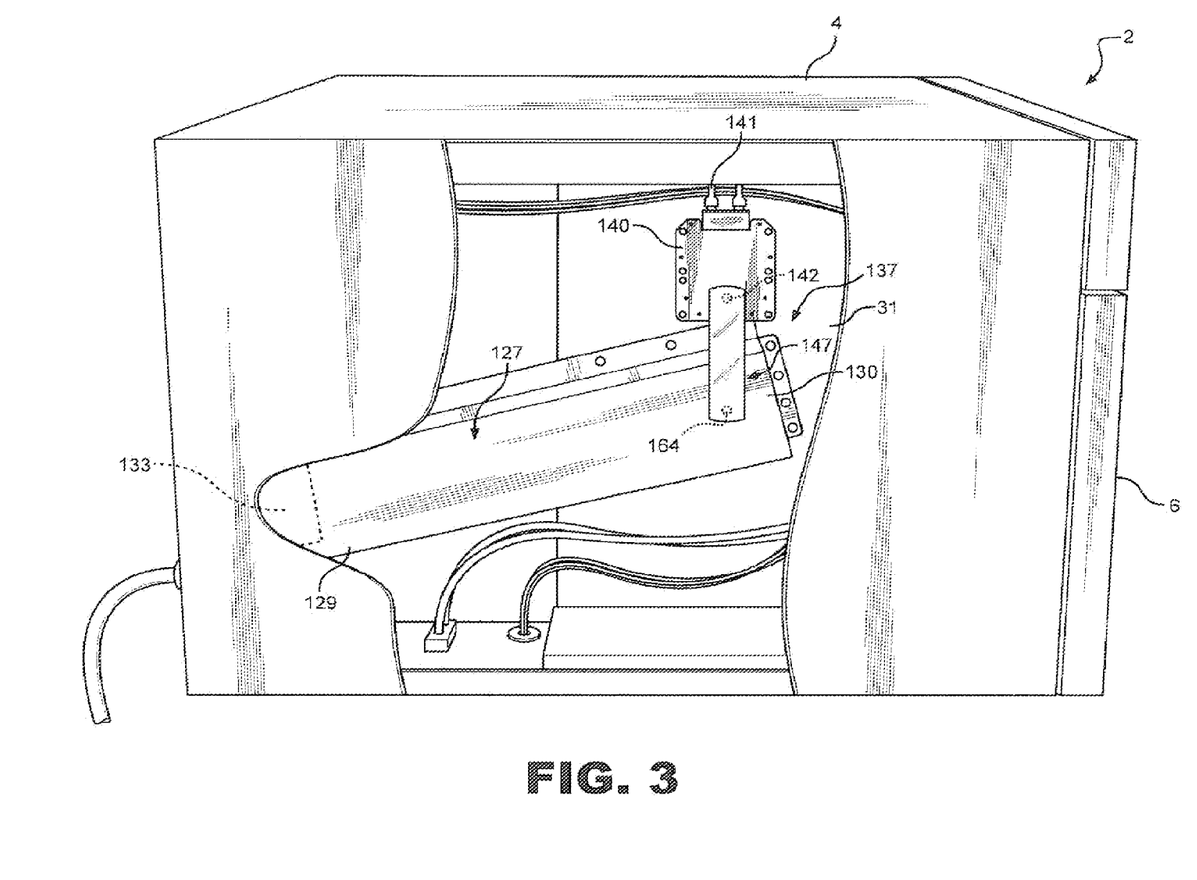
FIG. 3 is a partial cut-out side view of the cooking appliance of FIG. 2.

As clearly shown in these figures, discharge plenum portion 52 is provided with a plurality of nozzles 70 which are spaced along top wall 28 and fluidly interconnect discharge plenum portion 52 with oven cavity 12. In the preferred embodiment shown, the plurality of nozzles 70 are essentially grouped in a first or foremost region 72, a second or intermediate region 73, and a third or aft region 74. As depicted, a portion of the plurality of nozzles 70 located in third region 74 are located prior to catalyst 67, while the remainder of the plurality of nozzles 70 at each of first, second and third regions 72-74 are arranged downstream of catalyst 67. Further details of the nozzle arrangement will be provided below. For use in connection with controlling operating temperatures within oven cavity 12, a first temperature sensor 76 is provided within return plenum portion 46 and a second temperature sensor 77 is provided within discharge plenum portion 52. In the most preferred embodiment shown, second temperature sensor 77 is provided directly adjacent catalyst unit 67. As the manner in which heating elements 40 and 65 are controlled to establish and maintain a desired temperature within oven cavity 12 is not part of the present invention, it will not be further discussed herein. Instead, reference is made to copending U.S. patent application entitled "Temperature Control for Cooking Appliance Including Combination Heating System" filed on even date herewith and incorporated herein by reference.

With the above arrangement, operation of blower 55 will create a circulating air flow into and out of oven cavity 12. More specifically, a return flow constituted by a lower flow 79 going below oven rack 35 and an upper flow 80 going over food item 36 will be drawn in to return plenum portion 46 through the plurality of openings 47 of the air intake. This return air, generally indicated at 81, will flow by first temperature sensor 76 and be directed into fan unit 57 through openings 60. Through operation of fan unit 57, the return air flow 81 will be redirected radially outwardly as convection air stream 82. Air stream 82 will be heated upon flowing across convection heating element 65, with a portion of the convection air stream 82 flowing directly into oven cavity 12 at the various nozzles 70 (see air streams 84) arranged in third region 74 prior to catalyst 67, while a majority of the air flow will flow across catalyst 67 as indicated at 85. The air stream 85 will then flow through the remainder of the plurality of nozzles 70 in the first-third regions 72-74 and back into oven cavity 12, with the air flowing around food item 36 prior to the flow cycle being repeated.

In accordance with the most preferred embodiment of the invention, oven cavity 12 is not completely sealed. Instead, during operation of cooking appliance 2, a low pressure is established within oven cavity 12 and a certain amount of ambient air is drawn into oven cavity 12 around door 6, as indicated at 88. In addition to providing a certain amount of fresh air for the cooking operation, the ambient air stream 88 advantageously functions to reduce door temperature. Based on the desire to allow ambient air 88 into oven cavity 12, cooking appliance 2 also employs an exhaust system wherein a small amount of the generally recirculated air is exhausted. More specifically, the exhaust system includes an exhaust tube 92 having a first end 93 opening up into discharge plenum portion 52 and a second end 94 which terminates at a predetermined location within cavity 4. With this arrangement, the recirculated air utilized for cooking has a portion thereof which is lead into exhaust tube 92 so as to define a cooking exhaust stream generally indicated at 95. The overall exhaust system also includes an exhaust mixing tube 97 having a first end 99 which preferably encompasses and yet is radially spaced from second end 94 of exhaust tube 92. That is, first end 99 of exhaust mixing tube 97 preferably has an enlarged diametric dimension relative to second end 94 of exhaust tube 92, with exhaust mixing tube 97 also having associated therewith a second end 100 having an upwardly opening exit 102. As will be discussed more fully below, exhaust mixing tube 97 preferably angles downwardly and rearwardly within cabinet 4 as clearly shown in FIG. 2.

Also included in connection with cooking appliance 2 is a cooling system arranged within cabinet 4. More specifically, a cooling fan 105 is mounted behind return plenum portion 46. Operation of cooling fan 105 functions to draw a flow of cooling air 106 into cabinet 4, such as through cabinet openings 108. The cooling air 106 is directed by cooling fan 105 through a rear chamber 111 to establish a cooling exhaust stream indicated at 114. Cooling exhaust stream 114 flows about and cools motor 56, as well as various electronic components (not shown), and then around second end 94 of exhaust tube 92 as indicated at 115. This cooling exhaust stream 115 then flows into exhaust mixing tube 97 at first end 99 and mixes with cooking exhaust stream 95 to establish a mixed exhaust stream indicated at 117. Actually, the provision for the cooling air flow creates an elevated pressure in cabinet 4, about oven cavity 12. The cooling exhaust stream 115 flows at a relatively high speed into exhaust mixing tube 97 such that a suction is created which draws cooking exhaust stream 95 into exhaust mixing tube 97. Mixed exhaust stream 117 is then lead through exhaust mixing tube 97 and out upwardly opening exit 102 as a final exhaust 120.

With the arrangement discussed above, cooking appliance 2 can be employed to cook food items utilizing both radiant and convection cooking techniques. However, it is also desired to further incorporate microwave cooking techniques. To this end, as best shown in FIG. 3, cooking appliance 2 is also provided with a pair of wave guides mounted along opposing side walls 31, with one of the waveguides being indicated at 127. Basically, the arrangement on each side of oven cavity 12 is preferably, identically constructed such that reference will be made in detailing one side arrangement. In any case, in connection with the microwave system employed, waveguide 127 includes a first end portion 129 and a second end portion 130. Generically indicated at 133 is a magnetron for generating microwaves which propagate through waveguide 127 and are lead into oven cavity 12. At second end portion 130 is provided a stirrer assembly generally indicated at 137. In the preferred embodiment shown, stirrer assembly 137 includes a motor housing 140 to which is applied electric current through wires 141. Motor housing 140 has associated therewith a rotatable output shaft 142 linked to a mechanism 147 for transferring the rotation of output shaft 142 to a drive member 164. Drive member 164 is fixed for rotation to a rotatable stirrer 168 (see FIG. 2) which is mounted behind a respective side wall 31. Further details of the microwave supply and distribution arrangement is not part of the invention but rather can be found in copending U.S. patent application entitled "Combination Cooking Appliance Including Multiple Microwave Heating Units With Rotatable Antennae" filed on even date herewith and incorporated herein by reference. In the most preferred embodiment, the overall microwave system is designed to introduce microwaves from both of opposing side walls 31 at a position close to top wall 28. This arrangement is considered to at least facilitate the use of metal pans by introducing the microwave energy into the oven cavity at a position wherein the metal pans will not block the microwave energy from reaching the food load. In any case, the stirrers 168 provided on side walls 131 further enhance the distribution of the microwaves for oven cavity 12.

With the above construction, cooking appliance 2 can operate in various modes including: microwave only mode; bake mode; combination bake and convection mode; and full combination mode with microwave, radiant, and hot air convection for high speed food cooking. As the operational mode details are not part of the present invention, they will not be further discussed herein. Instead, reference is made to copending U.S. patent application entitled "Cooking Appliance Including Combination Heating System" filed on even date herewith and incorporated herein by reference. In any case, the present invention is particularly concerned with the air circuit features of cooking appliance 2. More specifically, one aspect of the present invention is the location of fan unit 57 in combination with the angling and relative dimensions of blower plenum portion 49 as shown in FIG. 2. First of all, blower plenum portion 49 is angled at approximately 45°. This angling is also partly reflected at the juncture of top wall 28 and rear wall 30. Second, blower plenum portion 49, which is arranged downstream of return plenum portion 46 and almost entirely behind rear wall 30 of oven cavity 12 such that the plurality of openings 60 are rearward of the openings of air intake 47. Third, blower plenum portion 49 preferably has a depth that is less than a width of return plenum portion 46 and in the order of about ⅔ of the height of air intake 47, while approximately 20% of air intake 47 is arranged above rack 35. This overall arrangement provides for an extremely efficient ingress of recirculated air which is heated downstream of fan unit 57 and directed to the plurality of nozzles 70.

Figure 4:
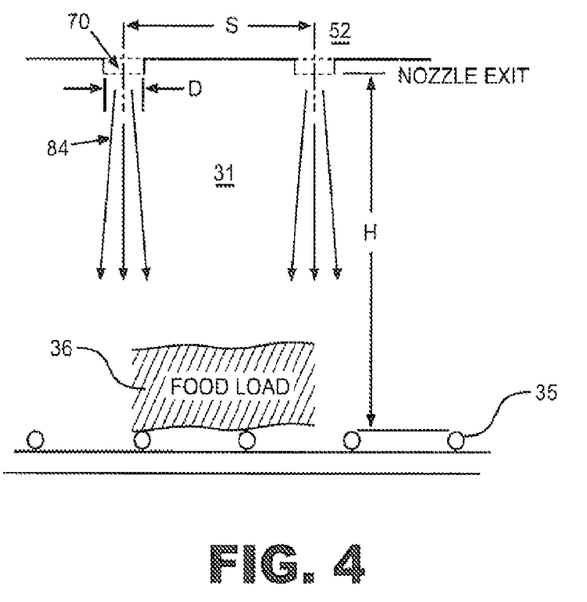
FIG. 4 is a schematic side view of a nozzle and food support configuration in accordance with the invention.

Another aspect of the present invention is concerned with the preferred geometry for the plurality of air nozzles 70 in cooking appliance 2, with the specified geometry providing for effective heating and browning or crisping of food item 36, while accelerating the cooking time. As particularly shown in FIGS. 4 and 5, rack 35, or other food item support, is held in a fixed position with respect to the nozzles 70 during cooking. As indicated above, nozzles 70 are part of a forced air circuit which directs high speed heated air towards food item 36 placed on rack 35 or other surface located below nozzles 70. The nozzles 70 are preferably arranged in a plane parallel to a top plane of rack 35 as best shown in FIG. 4, with a center axis of each of nozzles 70 being substantially perpendicular to the two planes. The distance from the exit of each nozzle 70 to the top plane of rack 35 is defined herein as H. The inner diameter of each nozzle 70 at the exit of the nozzle is defined herein as D. The distance between nozzle centers is defined herein as S. Based on the above:

D=nozzle inner diameter at nozzle exit

S=center to center distance between nozzles

H=distance from the nozzle exit to the top plane of the oven rack or other food load support structure.

In addition, the ratio of H divided by D is identified herein as the H/D ratio. The ratio of S divided by D is identified herein as the S/D ratio. With this data in mind, cooking appliance 2 has been specifically configured with an H/D ratio in the range of 19.0 to 22.0 and an S/D ratio in the range of 5.7 to 5.9.

Figure 5:
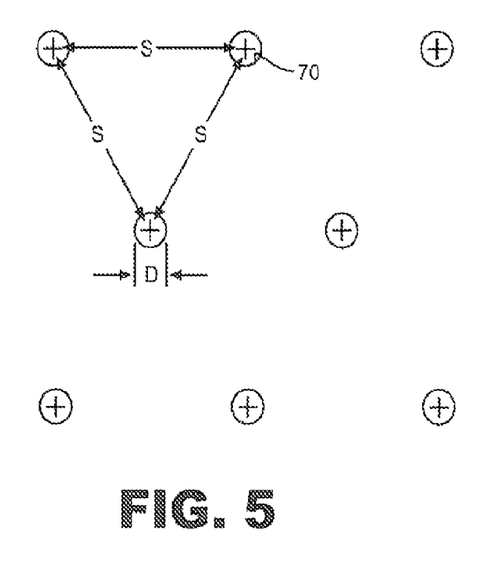
FIG. 5 is a top view of a nozzle pattern employed in accordance with the invention.

As previously indicated, it is a further aspect of the invention that the spacing between the nozzles 70 increase from first region 72 to second region 73 and further increase to third region 74. Basically, given the length and flow characteristics of discharge plenum portion 52, decreasing the spacing between adjacent nozzles 70 as air stream 85 flows forward such that the greatest number of nozzles 70 is in the first or forwardmost region 72 provides for a more even distribution of the overall airflow exiting the plurality of nozzles 70 into oven cavity 12, thereby enhancing the even heating and browning of food item 36. In fact, with these overall design parameters, an efficient airflow and superior results are considered to be achieved in that uneven browning patterns are significantly less evident, while effective heat transfer is provided. Actually, the invention has surprisingly demonstrated a significant improvement in browning to consistency, providing extremely even browning of food products.

Although described with respect to a preferred embodiment of the invention, it should be readily understood that various changes and/or modifications can be made to the invention without departing from the spirit thereof. In general, the invention is only intended to be limited by the scope is, of the following claims.

We claim:

1. A cooking appliance for cooking food items using multiple cooking techniques comprising:
    a cabinet;
    an oven cavity arranged in the cabinet, said oven cavity including top, bottom, rear and opposing side walls;
    an oven rack supported in the oven cavity, said oven rack being spaced from the bottom wall of the oven cavity;
    a heating element positioned below the oven rack, said heating element being spaced from the bottom wall of the oven cavity;
    a microwave cooking system for selectively performing a portion of a cooking operation in the oven cavity;
    an airflow delivery system including:
        an air intake including a plurality of openings located in the rear wall of the oven cavity, said air intake having a height that extends from adjacent the bottom wall to above the oven rack;
        an air plenum including a return plenum portion exposed to the air intake, a blower plenum portion, and a discharge plenum portion extending over the oven cavity, said blower plenum portion having a depth that is in the order of two-thirds the height of the air intake;
        a blower including a fan unit located in the blower plenum portion and adapted to draw an air stream from the return plenum portion and direct the air stream into the discharge plenum portion;
        a convection heating element positioned in the air plenum for heating the air stream; and
        a plurality of discharge nozzles leading into the oven cavity from the discharge plenum portion, said plurality of discharge nozzles being arranged in a geometric pattern, with a greater number of the plurality of discharge nozzles being arranged near a front portion of the discharge plenum portion than near a rear portion of the discharge plenum portion;
    a heating element arranged downstream of the blower and selectively operated to heat the air stream;
    a catalyst positioned downstream of the heating element for removing foreign particles from the air stream; and
    an exhaust air system including:
        an exhaust air tube having a first end portion exposed to the air stream and a second end portion;
        an air mixing tube having a first end section extending about the second end portion of the exhaust air tube and a second end section defining an exhaust outlet leading from the cabinet; and
        a cooling air system for developing a cooling air stream flowing within the cabinet and leading into the first end section of the air mixing tube about the second end portion of the exhaust air tube.

2. A cooking appliance comprising:
    a cabinet;
    an oven cavity arranged in the cabinet, said oven cavity including top, bottom, rear and opposing side walls;
    an oven rack supported in the cooking chamber, said oven rack being spaced from the bottom wall of the oven cavity; and
    an airflow delivery system including:
        an air intake including a plurality of openings located in the rear wall of the oven cavity, said air intake having a height that extends from adjacent the bottom wall to above the oven rack;
        an air plenum including a return plenum portion exposed to the air intake, a blower plenum portion, and a discharge plenum portion extending over the oven cavity, said blower plenum portion having a depth that is less than the height of the air intake;
        a blower including a fan unit located in the blower plenum portion and adapted to draw an air stream from the return plenum portion and direct the air stream into the discharge plenum portion;
        a convection heating element positioned in the air plenum for heating the air stream; and
        a plurality of discharge nozzles leading into the oven cavity from the discharge plenum portion.

3. The cooking appliance according to claim 2, wherein the depth of the blower plenum portion is in the order of two-thirds the height of the air intake.

4. The cooking appliance according to claim 2, wherein the blower plenum portion has a depth that is less than a width of the return plenum portion.

5. The cooking appliance according to claim 2, wherein the air intake extends both above and below the oven rack.

6. The cooking appliance according to claim 5, wherein approximately 20% of the air intake is above the rack.

7. The cooking appliance according to claim 2, wherein the plurality of discharge nozzles has an associated nozzle exit diameter, with the nozzles are separated by a spacing distance, and wherein a ratio of the spacing distance to the exit diameter is in the range of 5.7 to 5.9.

8. The cooking appliance according to claim 2, wherein the plurality of discharge nozzles has an associated nozzle exit diameter, with the nozzles being separated from the oven rack by a spacing distance, and wherein a ratio of the spacing distance to the exit diameter is in the range of 19.0 to 22.0.

9. The cooking appliance according to claim 2, wherein the blower plenum portion extends at an angle of approximately 45°.

10. The cooking appliance according to claim 2, wherein the blower plenum portion is arranged downstream of the return plenum portion and substantially entirely behind the rear wall of the oven cavity.

11. The cooking appliance according to claim 10, wherein substantially the entire blower plenum portion is located rearward of the air intake.

12. A cooking appliance comprising:
    a cabinet;
    an oven cavity arranged in the cabinet, said oven cavity including top, bottom, rear and opposing side walls;
    an airflow delivery system including:
        an air intake located in the rear wall of the oven cavity;

an air plenum including a return plenum portion exposed to the air intake, a blower plenum portion, and a discharge plenum portion extending over the oven cavity;

a blower including a fan unit located in the blower plenum portion and adapted to draw an air stream from the return plenum portion and direct the air stream into the discharge plenum portion;

a convection heating element positioned in the air plenum for heating the air stream;

a plurality of discharge nozzles leading into the oven cavity from the discharge plenum portion;

a heating element arranged downstream of the blower and selectively operated to heat the air stream;

an exhaust air system including:

an exhaust air tube having a first end portion exposed to the air stream and a second end portion; and an air mixing tube having a first end section extending about the second end portion of the exhaust air tube and a second end section defining an exhaust outlet leading from the cabinet; and a cooling air system for developing a cooling air stream flowing within the cabinet and leading into the first end section of the air mixing tube about the second end portion of the exhaust air tube.

13. The cooking appliance according to claim 12, wherein the air mixing tube sloped downwardly and rearwardly from the exhaust air tube.

14. The cooking appliance according to claim 12, wherein the exhaust outlet of the air mixing tube opens upwardly from the second end section.

15. A cooking appliance comprising:

a cabinet;

an oven cavity arranged in the cabinet, said oven cavity including top, bottom, rear and opposing side walls; and an airflow delivery system including:

an air intake including a plurality of openings located in the rear wall of the oven cavity;

an air plenum including a return plenum portion exposed to the air intake, a blower plenum portion, and a discharge plenum portion extending over the oven cavity;

a blower including a fan unit located in the blower plenum portion and adapted to draw an air stream from the return plenum portion and direct the air stream into the discharge plenum portion;

a convection heating element positioned in the air plenum for heating the air stream; and a plurality of discharge nozzles leading into the oven cavity from the discharge plenum portion, said plurality of discharge nozzles being arranged in a geometric pattern, with a greater number of the plurality of discharge nozzles being arranged near a front portion of the discharge plenum portion than near a rear portion of the discharge plenum portion.

16. The cooking appliance according to claim 15, wherein the plurality of discharge nozzles has an associated nozzle exit diameter, with the nozzles are separated by a spacing distance, and wherein a ratio of the spacing distance to the exit diameter is in the range of 5.7 to 5.9.

17. The cooking appliance according to claim 16, wherein the plurality of discharge nozzles has an associated nozzle exit diameter, with the nozzles being separated from the oven rack by a spacing distance, and wherein a ratio of the spacing distance to the exit diameter is in the range of 19.0 to 22.0.

18. The cooking appliance according to claim 15, further comprising: a catalyst positioned adjacent to the convection heating element in the air plenum, wherein some of the plurality of discharge nozzles are located downstream of the catalyst and others of the plurality of discharge nozzles are located upstream of the catalyst.

19. The cooking appliance according to claim 18, wherein a majority of the plurality of discharge nozzles are located downstream of the catalyst.

20. The cooking appliance according to claim 15, wherein said air intake has a height that extends from adjacent the bottom wall to above the oven rack.

* * * * *